United States Patent Office 3,637,610
Patented Jan. 25, 1972

3,637,610
MULTIFUNCTIONAL POLYMERIC ADDITIVE
Norman Jacobson, East Brunswick, N.J., assignor to Esso Research and Engineering Company
No Drawing. Continuation-in-part of application Ser. No. 664,925, Sept. 1, 1967. This application Feb. 25, 1970, Ser. No. 14,190
Int. Cl. C08f 27/08
U.S. Cl. 260—78.5 T        13 Claims

ABSTRACT OF THE DISCLOSURE

A hydrocarbon-oil-soluble polymeric additive having multifunctional qualities including viscosity-index-improving properties and sludge-dispersing properties is prepared by reacting an oil-soluble polymeric material, which contains acid or acid anhydride groups distributed along the polymer chain, with a heterocyclic amino compound under conditions which cause the formation of an amide or imide linkage between carboxyl or carboxyl anhydride groups of the polymer and the amino groups of the heterocyclic amino compound. The latter is characterized as a heterocyclic amino compound of the pseudo-aromatic type that has either oxygen or nitrogen in the ring, has only one group with an active amino hydrogen, contains no other active hydrogen groups, and has the amino group separated from the ring by from one to five carbon atoms.

RELATED APPLICATION

This application is a continuation-in-part of application Ser. No. 664,925, filed Sept. 1, 1967, now O.G. defensive publication, published in 858 O.G.724 on Jan. 21, 1969.

BACKGROUND OF THE INVENTION

This invention relates to a multifunctional polymeric additive for oil compositions, particularly for lubricating oils. The additive is derived from an oil-soluble polymeric material which initially contains acid groups distributed along the polymer chain, the acid groups being defined as either carboxylic acid groups or carboxylic anhydride groups. These groups are reacted with a heterocyclic amino compound under conditions which convert the said groups into either imides or amides, whereby sludge dispersancy properties are imparted to the original polymeric material.

This invention is generally applicable to the improvement of a multifunctional copolymer that contains a plurality of free acid and/or acid anhydride groups. Such polymers are primarily known for their V.I. (viscosity index) improving properties. Representative of a preferred polymer of the type that can be improved by the present invention is a copolymer made up of three types of unsaturated compounds, namely; an unsaturated aliphatic alcohol ester of a short chain fatty acid such as vinyl acetate; an aliphatic alcohol ester of an unsaturated dicarboxylic acid, e.g. dodecyl fumarate; and an unsaturated carboxylic acid or anhydride such as maleic anhydride, acrylic acid, methacrylic acid, the half ester of maleic acid and so forth. Terpolymers of this type have both V.I. improving and pour point depressing properties, as well as minor sludge dispersing ability resulting from the presence of the acid groups of the maleic anhydride. Terpolymers of vinyl acetate, an alkyl fumarate and maleic anhydride are taught, for example, in U.S. Pat. 3,087,893 and include copolymers made up of from 2 to 15 mole percent of maleic anhydride, 25 to 50 mole percent of an alkyl ester of an alpha, beta-unsaturated dicarboxylic acid, and from 40 to 70 mole percent of an alkylene ester of a $C_1$ to $C_6$ monocarboxylic acid. Techniques for forming the polymers are also well known. For example, a terpolymer of an alkyl fumarate, vinyl acetate, and maleic anhydride can be prepared by the process disclosed in the aforementioned U.S. Pat. 3,087,893 or by the improved process described in U.S. Pat. 3,136,743.

Other representative polymers that can be improved by this invention include copolymers of acrylate esters or methacrylate esters with acidic compounds such as methacrylic acid, maleic acid and the like and copolymers of olefins with unsaturated carboxylic acids.

DESCRIPTION OF THE INVENTION

It has now been found that by taking oil-soluble polymers which have free carboxylic acid or carboxylic anhydride groups along the polymer chain and reacting those polymers with heterocyclic amino compounds, so as to convert about 25 to 100% of those groups to either amide or imide groups, sludge dispersing properties are introduced into the copolymers where none existed before and in those cases where the copolymers had sludge dispersing properties such properties are greatly enhanced.

Broadly, this invention can be applied to any copolymer that is soluble in a hydrocarbon oil and that is made up at least of an oil-solubilizing monomer and a monomer that contributes a carboxylic acid function (acid or anhydride). The oil-soluble monomer can be polar or nonpolar. Oil-solubilizing monomers of this general character are well known in the art and are frequently employed as the oil-solubilizing portion of copolymers which are added to lubricating oils to improve the viscosity index and pour point characteristics thereof. They include such materials as olefins and ethylenically unsaturated ethers, esters, ketones, aldehydes, and the like.

The oil-solubilizing monomers that can be used include: olefins of from 2 to 20 carbon atoms, preferably 4 to 12 carbon atoms; unsaturated ethers of from 2 to 20 carbon atoms, preferably 2 to 12 carbon atoms, in each hydrocarbyl group; unsaturated esters wherein at least one of the portions, acid or alcohol, has from 2 to 6 carbon atoms; polymerizable nitrogen compounds such as N-vinyl pyrrolidone, acrylonitrile; etc.

Representative olefins include isobutylene, hexene-1, 2-ethyl hexene-1, diisobutylene, styrene, tripropylene and octadecene-1. Representative unsaturated ethers include vinyl n-butyl ether, vinyl hexyl ether, allyl isobutyl ether, propenyl 2-ethyl hexyl ether, vinyl dodecyl ether, and isopropenyl dodecyl ether. Representative unsaturated esters include vinyl acetate, vinyl stearate, allyl laurate, isopropenyl acetate, and methallyl naphthenate.

Particularly useful esters include $C_6$ to $C_{30}$, preferably $C_8$ to $C_{20}$, esters of alpha, beta-unsaturated monocarboxylic, dicarboxylic, or tricarboxylic acids of from 3 to 8 carbon atoms. Representative acids of this type are acrylic, methacrylic, crotonic, tiglic, angelic, α-ethylacrylic, α-methylcrotonic, α-ethylcrotonic, β-ethylcrotonic, β-propylcrotonic, hydrosorbic, maleic, fumaric, itaconic, citraconic, aconitic, and the like. Representative esters of this type include lauryl methacrylate, octadecyl methacrylate, octadecyl acrylate, dilauryl aconitate, stearyl methacrylate, hexyl citraconate, octadecyl maleate, octyl itaconate, lauryl fumarate, tallow alcohol fumarates, hydroxyethyl methacrylate, hydroxypropyl acrylate, $C_8$ or $C_{13}$ oxo alcohol fumarate or maleate, etc. Esters of glycol monoalkyl ethers and fumaric, maleic or itaconic acids may also be used, such as Cellosolve fumarate (glycol monoethyl ether fumarate).

By tallow fumarates or maleates are meant the esters of fumaric or maleic acid and the alcohols derived from tallow by hydrogenation and/or by sodium reduction.

The tallow alcohols are principally, e.g. up to 98% or more, of mixed $C_{16}$ to $C_{18}$ alcohols, with minor amounts, e.g. 2% or less, of $C_{12}$ to $C_{14}$ and $C_{20}$ alcohols. The oxo alcohols are well known in the art and are ordinarily prepared from olefins by reaction with carbon monoxide and hydrogen in the presence of a suitable catalyst, as for example, a cobalt carbonyl. The reaction products are primarily aldehydes having one more carbon atom than the starting olefins. These aldehydes are then hydrogenated in a separate catalytic stage to convert them to the corresponding alcohols.

More than one type of oil-solubilizing monomer can be used in preparing the copolymers, e.g., a combination of an olefin, such as isobutylene or styrene, with one or more esters, e.g., vinyl propionate and mixed lauryl fumarate and octadecyl fumarate.

The acid function in the copolymers can be derived from any polymerizable acid monomer, including acrylic acid, methacrylic acid, maleic acid, fumaric acid, glutaconic acid, citraconic acid, tiglic acid, hydrosorbic acid, etc., or stated more generally, an alpha, beta-unsaturated monocarboxylic, dicarboxylic, or tricarboxylic acid of from 3 to 8 carbon atoms. Mono-esters or mono-amides or monoamine salts of dicarboxylic acids of the above types, e.g. monolauryl maleate, the hydroxy propyl half amide of fumaric acid, etc. of unsaturated tricarboxylic acids.

Preferably the acid function is provided by the anhydride of an alpha,beta-unsaturated dicarboxylic acid of 4 to 6 carbon atoms, including the anhydrides of such acids as maleic, citraconic, itaconic, etc.

Another type of copolymer that can be improved by the practice of the present invention is the maleic acid adduct of a copolymer of an alpha-olefin of from 2 to 20 carbon atoms and a diolefin of from 5 to 20 carbon atoms, such as disclosed in U.S. Pat. 3,231,498 of Louis de Vries.

Still other types of carboxyl-containing copolymer that can be reacted with a heterocyclic amino compound in accordance with the present invention are those obtained by grafting monomers containing at least one vinylidene group and at least one carboxyl group onto hydroperoxidized copolymers of ethylene and at least one other alpha olefinic monomer, e.g. a hydroxylated ethylene-propylene copolymer grafted with maleic anhydride, such as is shown in Example 5 of U.S. Pat. 3,326,804 of Shih-En Hu.

Acid functions can also be introduced by controlled oxidation of a hydrocarbon polymer or copolymer of an alpha olefin, e.g. of ethylene, propylene, or butene, or of a copolymer of one or more alpha olefins with a nonconjugated diene, e.g. 1,5-hexadiene, methylene norbornene, ethylidene norbornene, norbornadiene, etc. It is known in the chemical literature that unsaturated groups can be oxidized to COOH groups with the aid of suitable catalysts such as $MnO_2$, sodium permanganate, etc. See for example, "Basic Principles of Organic Chemistry" by J. D. Roberts and M. C. Caserio, page 559 (W. J. Benjamin, Inc. New York, 1965).

As previously stated, a particularly preferred oil-soluble copolymer that is improved by reaction with a heterocyclic amino compound in accordance with this invention is a terpolymer of an unsaturated aliphatic alcohol ester of a short chain fatty acid, an aliphatic alcohol diester of an unsaturated dicarboxylic acid, and an unsaturated carboxylic acid or anhydride of from 3 to 8 carbon atoms.

More specifically, the unsaturated aliphatic alcohol ester that constitutes one component of the terpolymer is an allyl or vinyl ester of a $C_2$ to $C_6$ fatty acid, such as allyl acetate, vinyl hexanoate, vinyl butyrate, allyl propionate, etc. The vinyl esters of $C_2$ to $C_4$ fatty acids, i.e. acetic, propionic and butyric are preferred. Vinyl acetate is particularly preferred.

A second component of the preferred terpolymer is a $C_6$ to $C_{20}$ aliphatic monohydric alcohol diester of a $C_4$ to $C_6$ alpha,beta-unsaturated dicarboxylic acid, e.g. maleic, fumaric, itaconic, citraconic and mesaconic acids. Preferably the esters are $C_8$ to $C_{18}$ esters of fumaric acid.

The alcohols which are reacted with fumaric acid or related unsaturated dicarboxylic acid to form the dicarboxylic acid ester will contain 8 to 20 carbon atoms and include such alcohols as $C_{10}$ (decyl), $C_{12}$ (lauryl) and $C_{14}$ (tetradecyl) alcohol. A mixture of two or more alcohols having an average number of carbon atoms ranging from about 8 to 18, and preferably averaging about 10 to 14 carbon atoms, can also be employed in forming the dicarboxylate ester. These include the tallow alcohols previously mentioned and the mixed alcohols obtained by hydrogenation and/or sodium reduction of coconut oil. The latter alcohols are predominantly (65 to 70%) $C_{12}$ and $C_{14}$ alcohols, with about 13 to 15% $C_8$ and $C_{10}$ alcohols, the balance being $C_{16}$ and $C_{18}$ alcohols. Refined cuts of these alcohols are also available. See for example, U.S. Pat. 2,721,877, column 3, lines 23 to 33.

Other alcohols that can be used include octyl, decyl, cetyl, octadecyl, as well as a mixture of octyl or decyl with cetyl or octadecyl, and a mixture of $C_8$, $C_{10}$, $C_{12}$, $C_{14}$, $C_{16}$, and $C_{18}$ alcohols having an average in the $C_{11}$ and $C_{14}$ range. While alcohols having less than 8 carbon atoms, e.g. hexyl, amyl, or even lower can be used, it is preferable in such instances that a sufficient amount of higher alcohols, having for instance 12 to 18 carbon atoms, also be used so as to make a total mixed alcohol product averaging at least as high as 8 carbon atoms and preferably averaging about 10 to 14 carbon atoms. When the alcohols in the fumarate or related ester average above about $C_{12}$, for example about $C_{13.5}$, the copolymers are exceptionally active as pour depressants as well as V.I. improvers.

In preparing the fumaric or similar acid ester, which may also be called, e.g., a dialkyl fumarate, direct esterification of fumaric acid for example, with an alcohol is the usual practice, although ester interchange between a lower alkyl fumarate such as methyl or ethyl or amyl fumarate, and a higher alcohol of the desired type, e.g., one having 8 to 18 carbon atoms or so, such as tetradecyl, can also be employed.

It should also be understood that the dialkyl fumarates, maleates, itaconates, etc. useful in the process of this invention can be mixtures of dialkyl esters prepared by esterification of mixed alcohols with the acid. For example, a particularly useful dialkyl ester mixture for the process of this invention is one which consists of tallow fumarate, $C_8$ oxo fumarate, and $C_{13}$ oxo fumarate.

The third component of the preferred terpolymer is an unsaturated acid, which can be an unsaturated $C_4$ to $C_6$ acid anhydride such as maleic anhydride or an unsaturated $C_3$ to $C_6$ monocarboxylic acid such as acrylic acid, angelic acid, tiglic acid, or methacrylic acid etc., or it can be the free carboxyl group portion of a $C_1$ to $C_{18}$ alcohol mono ester of an alpha, beta-unsaturated $C_4$ to $C_6$ dicarboxylic acid, e.g. the monoethyl ester or the monolauryl ester of fumaric acid.

Molar proportions of the monomers employed in preparing terpolymers of the type mentioned above are set forth below. These copolymers are referred to as terpolymers because of the three different types of monomers used, even though typically they will be made from more than three specific monomers. See for instance, Example 1, later in this specification.

| | Mole percent in terpolymer | |
|---|---|---|
| | Broad range | Preferred range |
| Aliphatic diester of alpha,beta-unsaturated dicarboxylic acid | 10–50 | 20–40 |
| Alkylene ester of short chain fatty acid | 35–80 | 40–70 |
| Dicarboxylic acid anhydride or other monomer having free COOH group | 1–15 | 2–10 |

The polymers and copolymers that are reacted with heterocyclic amino compounds in accordance with this invention can be prepared by any well-known polymerization process, including low temperature Friedel Crafts polymerization, ionic polymerization processes, or radiation polymerization processes. Peroxide type catalysts and other free radical catalysts are particularly useful. These include benzoyl peroxide, acetyl peroxide, urea peroxide, azo bis-isobutyro nitrile, tertiary butyl perbenzoate, etc. These catalysts can be employed in concentrations in the range of from about 0.01 to about 5 wt. percent or more usually from about 0.01 to 2 wt. percent. The polymerization can be carried out in a suitable solvent in order to control reaction velocity and molecular weight. Oxygen can be excluded during the polymerization by the use of a blanket of an inert gas such as nitrogen or carbon dioxide. The suitable solvents for controlling the reaction include benzene, refined naphtha, kerosene, heptane, mineral lubricating oil, etc. Polymerization temperatures can range from about 100° F. to about 230° F. and reaction time can vary from about 2 to 10 hours or more. Normally, the reaction time will vary inversely with the temperature. If necessary, one can use either superatmospheric pressure or refluxing, to prevent loss of reactants by vaporization, and cooling can be provided to absorb the heat of polymerization. The preferred terpolymers used in this invention can be prepared as taught in U.S. Pat. 3,136,743 of W. D. Conway et al.

The polymers used in the invention will have molecular weights in the range of from about 5000 to about 2,000,000, or more preferably, from about 30,000 to about 1,000,000. The molecular weight can be determined by measuring the viscosity of solution containing 5 milligrams of the polymer per cc. in diisobutylene and then applying the Staudinger equation. Particularly preferred are polymers having average molecular weights in the range of about 80,000 to about 800,000.

The copolymers employed for reaction with the amino compounds in accordance with the present invention should have at least 1 mole percent of free carboxyl or anhydride groups and can have as much as 25 mole percent of such groups. Preferably the mole percent of free carboxyl or anhydride groups will be in the range of about 2 to about 10.

The heterocyclic amino compounds that are employed in the reactions of the present invention are of the pseudoaromatic type that have either oxygen or nitrogen in the ring, have only one group with an active amino hydrogen, contain no other active hydrogen groups, and have the amino group separated from the ring by at least one carbon atom.

A particularly effective class of heterocyclic amino compounds for use in this invention includes aminoalkyl pyridines and alkyl aminoalkyl pyridines, having the formula:

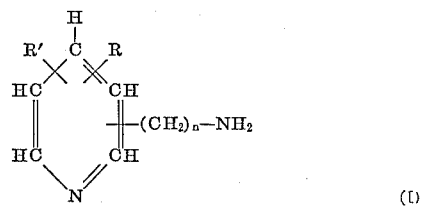

(I)

wherein $n$ is a number from 1 to 5, and wherein each of R and R' is either hydrogen or a $C_1$ to $C_5$ alkyl group. Preferably $n$ is one. The $(CH_2)_n$ group and R and R' can be attached to any position in the ring except the hetero atom. For this reason the ring itself is shown as if there were no substituents. It will be understood that the hydrogen atoms shown in the ring will be missing from the particular carbon atoms to which any of these substituents is attached. Examples of this type of compound include: 2-aminomethyl pyridine, 2-aminoethyl 4-methyl pyridine, 2-aminobutyl 5-ethyl pyridine, and 2-aminomethyl 4-butyl 5-propyl pyridine.

Another effective class of heterocyclic amino compounds are aminoalkyl furans represented by the formula:

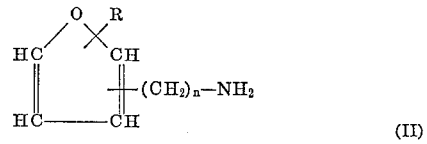

(II)

wherein $(CH_2)_n$ can be in the alpha or beta position and $n$ is a number from 1 to 5, preferably 1 to 3, and most preferably 1. As in Formula I, R is either hydrogen or a $C_1$ to $C_5$ alkyl group which can be attached to any of the four carbon atoms in Formula II other than the one to which the $(CH_2)_n$—$NH_2$ group is attached. Examples include 2-aminomethyl furan (furfurylamine), 2-(3-aminopropyl) furan, and 2-(5-aminoamyl) furan. Included in this class are also alkyl amino alkyl furans having alkyl groups of from 1 to 5 carbon atoms, e.g., 2-aminomethyl 5-methyl furan.

It has previously been proposed, as disclosed for example, in U.S. Pat. 2,892,786, to improve oil-soluble polymeric materials containing acid groups by reacting those polymers with polyfunctional amino compounds, as for example with tetraethylenepentamine, diethylenetriamine, diethanolamine, N-aminoethyl ethanolamine and the like. It has been found, however, that when modifying acid-containing copolymers by reacting them with the amino compounds of the suggested types of the prior art, having more than one functional group, there is a tendency to encounter cross-linking and gel formation so that the additives are not entirely satisfactory. The present invention avoids this problem.

The preferred method of practicing the present invention is to prepare the copolymer first, then react the copolymer with 0.1 to 2 moles (preferably 0.5 to 1.5 moles) of the amino compound per anhydride group or 0.1 to 1 mole (preferably 0.5 to 1 mole) per carboxylic acid group in the coplymer. Conveniently, the copolymer may be dissolved in a suitable inert solvent such as toluene, to increase the mobility of the copolymer and at the same time to furnish an entraining agent for the removal of the water that is produced during the amide-forming of the imide-forming reaction. Reaction temperatures will generally be in the range of about 200 to 450° F., or preferably about 230 to 400° F. The mixture of copolymer, entraining agent, and amino compound is preferably heated at reflux temperature until the reaction has essentially reached completion as determined by the quantity of water carried overhead by the water-entraining agent. If the acid groups are monocarboxylic, amides will be formed. If the acid groups are dicarboxylic anhydrides, either amides or imides will be formed, depending upon the degree of water removed, as is known to the chemical art. At the completion of the reaction the solvent used in the reaction can be removed by raising the temperature sufficiently to accomplish this result without decomposing the product. Removal of solvent can be aided by bubbling a nonreactive gas, such as nitrogen, through the solution while applying heat. Solvent removal can also be aided by reducing the pressure.

An alternative procedure is to first form the imide or amide between the carboxyl group-containing or anhydride-group-containing monomer, e.g. maleic anhydride, and the heterocyclic nitrogen compound, and then copolymerize the product with the remaining monomer or monomers that will make up the desired multifunctional additive of the invention. Care must be exercised, in using the alternative procedure, to ensure that no free amino groups remain because the latter will interfere with the efficacy of the polymerization catalyst.

The sludge-dispersing additives of this invention will be employed in concentrations ranging from about 0.001 to about 10 wt. percent in oil compositions ranging from gasoline fractions through middle distillate fuels and lubricating oils. In lubricating oil compositions, the additives will generally be used in concentration ranges of about 0.01 to 10 wt. percent, preferably 0.1 to 5 wt. percent. These lubricating oils include not only mineral lubricating oils, e.g., paraffinic, naphthenic, mixed base, etc., but also synthetic oils, e.g. synthetic hydrocarbons, dibasic acid esters such as di-2-ethyl hexyl sebacate, carbonate esters, phosphate esters, halogenated hydrocarbons, polysilicones, polyglycols, etc.

The additives of this invention can also be used in middle distillate fuels for inhibiting corrosion and the formation of sludge and sediment in such fuels. Here, concentration ranges of about 0.001 to about 2 wt. percent, or more usually from about 0.005 to 0.2 wt. percent, are employed. Petroleum distillate fuels boiling in the range of from about 300° to about 900° F. are included. Typical of such fuels are No. 1 and No. 2 fuel oils that meet ASTM Specification D–396–48T, diesel fuels qualifying as Grades 1D, 2D and 4D of ASTM Specification D–975–51T, and various jet engine fuels. Because they are ashless, these additives are particularly desirable for such fuels in that they do not give rise to glowing ashes nor deter from the burning qualities of the distillates.

The additives of this invention can also be employed, either alone or in combination with other hydrocarbon-soluble additives, in jet fuels and gasolines in concentrations ranging from about 0.001 to 1.0 wt. percent as detergent and/or rust preventive additives.

In any of the aforesaid fuel or lubricant compositions, other conventional additives may also be present, including: dyes; pour point depressants, e.g. wax-alkylated naphthalene; antiwear agents, e.g. tricresyl phosphate, or zinc dialkyl dithiophosphates of 3 to 8 carbon atoms; antioxidants such as phenyl-alpha-naphthylamine, tert. octylphenol sulfide, bis-phenols such as 4,4'-methylene bis (2, 6-di tert. butyl) phenol; viscosity index improvers such as polymethacrylates, polyisobutylene, and the like; as well as other dispersants, e.g. alkaline earth metal hydrocarbon sulfonates, metal salts of alkyl phenols, etc.

It is within the contemplation of this invention to prepare additive concentrates having from 10 to 80% of additive, the balance being mineral oil, usually lubricating oil, for convenience in handling.

The nature of this invention will be better understood by reference to the following examples which include a preferred embodiment.

EXAMPLE 1

A 5-liter reaction flask equipped with a thermometer, addition funnel, mechanical stirrer, reflux condenser and Dean-Stark trap was charged with 2027 g. of an oil concentrate consisting of 60 wt. percent of mineral lubricating oil and 40 wt. percent copolymer of vinyl acetate, maleic anhydride, and mixed fumarate esters of $C_8$ oxo alcohols and tallow alcohols. The oil solution of copolymer was dissolved in 1800 ml. of toluene. The resulting solution was heated to reflux temperature (248–250° F.) and then 20.4 g. of 3-(amino-methyl)-pyridine dissolved in 400 ml. of toluene was added dropwise over a period of 45 minutes. This corresponded to about one amino group per anhydride group in the copolymers. The reaction was allowed to proceed for one hour, after which toluene was distilled off until the reaction temperature reached about 285° F. The remainder of the toluene was removed by bubbling nitrogen through the reaction solution at 175 to 185° F. A total of 2 ml. of water (theoretical 3.6 ml.) was collected before distilling the toluene off, at which time it was impossible to measure the further production of water. A total of 1899 g. of product was obtained and elemental analysis showed the product concentrate to contain 0.26% nitrogen. Infrared analysis indicated that a mixture of imide and amide reaction products had been formed.

The vinyl acetate-maleic anhydride-fumarate ester copolymer used above was prepared by the procedure described in U.S. Pat. 3,136,743 and was a copolymer of 49.3 mole percent vinyl acetate, 6.2 mole percent maleic anhydride, 25.8 mole percent di-$C_8$ oxo fumarate, 7.1 mole percent ditallow fumarate, and 11.6 mole percent di–$C_{13}$ oxo fumarates. It had an average molecular weight of about 500,000 as determined by solution viscosity measurement.

EXAMPLE 2

Using the same general procedure as described in Example 1, 1560 grams of the same concentrate of copolymer of vinyl acetate, maleic anhydride and mixed fumarates that were used in Example 1 were charged to the reaction flask and then mixed with 1800 ml. of toluene. This mixture was then heated to reflux temperature (248–250° F.) after which 14.4 grams of furfurylamine dissolved in 400 ml. of toluene was added dropwise to the reaction flask over a period of 90 minutes. This corresponded to about 1 amino group per anhydride group in the copolymer. The reaction was continued for an additional hour and then toluene was distilled off until the temperature of the reaction mixture reached about 285° F. The remainder of the toluene was then removed by bubbling nitrogen through the reaction mixture at 175–185° F. The amount of water collected in the Dean-Stark trap prior to distillation of the toluene was 1 ml. It was not possible to measure the total amount of water given off by the reaction before the distillation step. Theoretical production of water should be 2.7 ml. A total of 1564 grams of product was obtained and elemental analysis showed the product concentrate to contain 0.16 wt. percent nitrogen.

EXAMPLE 3

A copolymer containing about 7 wt. percent of free acid groups is prepared as follows: A mixture of 320 grams of dodecyl methacrylate, 80 grams of $C_8$ oxo methacrylate, 10 grams of itaconic acid, and 20 cc. of benzene is charged to a reaction flask equipped with stirrer, reflux condenser, thermometer and addition funnel. The mixture is heated to 220–225° F. with stirring. Over a period of about 6 hours a solution of 3 grams of benzoyl peroxide and 3 grams of tert. butyl hydroperoxide in 65 cc. of benzene is added dropwise, while stirring the reaction mixture, the temperature being maintained at 220–230° F. After an additional reaction time of 16 hours at about 200° F., the product is stripped of benzene by heating at reduced pressure, and then dissolved in 35 wt. percent concentration in a solvent-treated and mid-continent lubricating oil having 43 SUS viscosity at 210° F.

In the manner described in Example 1, a product is prepared comprising the amide formed by reacting the carboxyl groups of the itaconic acid in the copolymer prepared as just described, with 2-amino propyl 4-ethyl pyridine, in an amount calculated to convert 85% of the carboxyl groups to amide groups.

PREPARATION OF COMPARATIVE ADDITIVES

Preparation A

Using the procedure described in Example 1, 2069 grams of the copolymer concentrate therein described was reacted with 18.4 grams of N,N-dimethyl-1,3-propanediamine. 2.5 ml. of water (theoretical 3.6 ml.) was obtained before distillation of xylene. The yield of product concentrate was 1952 grams.

Preparation B

The procedure of Example 1 was again repeated wherein 1560 grams of the copolymer concentrate was reacted with 14 grams of 2-aminopyridine in 1800 ml. of toluene. Yield of product concentrate was 1571 grams.

Preparation C

Again repeating the preparation of Example 1, 4340 grams of the copolymer concentrate was reacted with 57 grams of N-(3-amino-propyl)-morpholine in 3600 ml. of toluene. The yield of product concentrate was 4263 grams.

Preparation D

Again repeating the procedure of Example 1, 2160 grams of the copolymer concentrate was reacted with 19.6 grams of tetrahydrofurfurylamine in 1800 ml. of toluene. The amount of water collected in the trap was 2.8 ml. (theoretical 3.6 ml.) before final distillation of toluene. The yield of product concentrate was 2082 grams.

Preparation E

Using the procedure of Example 1, 500 grams of the copolymer concentrate therein described was reacted with 18.9 grams of tetraethylene pentamine, this representing a ratio of 0.5 mole of amino compound per anhydride group in the copolymer. The procedure was repeated, using 511.5 grams of the polymer concentrate and 8.5 grams of tetraethylene pentamine, representing a ratio of 1 mole of amino compound per anhydride group in the copolymer. In both instances a gel was formed, which was unsatisfactory as a petroleum oil additive.

Preparation F

Using the procedure of Example 1, 513 grams of the copolymer concentrate therein described was reacted with 10.4 grams of diethylene triamine, this being a ratio of 0.5 mole of amine per anhydride group in the copolymer. The product obtained was a gel.

EXAMPLE 4

Blends were prepared by simple mixing of 7 wt. percent of each of the separate product concentrates of Examples 1 and 2 and of the comparative product concentrates A, B, C and D with 93 wt. percent portions of a reference lubricating oil. The latter was a solvent refined mineral lubricating oil having a viscosity of 202.6 SUS at 100° F. which had been fortified with conventional detergents and antioxidants. The reference oil had a viscosity index of 112. A comparative blend was also prepared by simple mixing of 93 wt. percent of the reference oil with 7 wt. percent of the starting copolymer concentrate that was used in each of the reactions. The viscosities of each of these blends were measured and the viscosity index was calculated. The results are given in the following Table I:

TABLE I

| Product | SUS viscosity at 210° F. | Viscosity index |
| --- | --- | --- |
| Original copolymer | 67.50 | 142 |
| Example: | | |
| 1 | 68.37 | 140 |
| 2 | 66.82 | 141 |
| Product: | | |
| A | 73.09 | 141 |
| B | 67.74 | 142 |
| C | 67.85 | 140 |
| D | 67.78 | 139 |

It will be noted from the results obtained that the viscosity index improving properties of the original copolymer concentrate were not materially impaired by reaction with any of the nitrogen compounds.

EXAMPLE 5

To a gasoline having an initial boiling point of 90° F., a 50% point of 208° F., and a final boiling point of 378° F. (ASTM D–86), said gasoline containing 17 vol. percent aromatics, 13 vol. percent olefins and 70 vol. percent saturated hydrocarbons, and having added thereto 2.9 cc. of lead tetraethyl per gallon, there is added by simple mixing about 0.013 wt. percent of the product concentrate of Example 1 as a dispersant and carburetor detergent.

EXAMPLE 6

To a heating oil comprising a mineral oil distillate having a boiling range of about 350° F. to about 685° F. and being composed of mixed cracked and straight-run petroleum fractions there is added about 0.07 wt. percent of the product of Example 2 to serve as a disperser of sediment and sludge.

EXAMPLE 7

A number of engine tests were conducted using as the base a mineral lubricating oil having a viscosity of 325 SUS at 100° F. and a viscosity index of 100, to which had been added by simple mixing, 3.5 wt. percent of a commercial detergent inhibitor, and 0.9 wt. percent of a dialkyl dithiophosphoric antiwear additive. The balance of the base oil was 95.6 wt. percent of the mineral lubricating oil.

The commercial detergent inhibitor mentioned above was a mineral oil concentrate solution containing an additive prepared by reacting a mixture of a phosphosulfurized polyisobutylene and nonyl phenol with barium hydroxide penetahydrate and blowing the reaction mixture with carbon dioxide. The approximate analysis of the concentrate was 27 wt. percent of phosphosulfurized polyisobutylene, 11.7 wt. percent of nonyl phenol, 10.6 wt. percent barium oxide, 2.5 wt. percent carbon dioxide, and 48.2 wt. percent of mineral oil.

The zinc dialkyldithiophosphate antiwear additive was an oil solution consisting of about 25 wt. percent of mineral lubricating oil and about 75 wt. percent of zinc dialkyldithiophosphate prepared by treating a mixture of isobutanol and mixed amyl alcohols with $P_2S_5$ followed by neutralizing with zinc oxide.

Using portions of the base oil just described, blends were prepared of each of the additive concentrates described in Examples 1 and 2, and in Preparations A, B, C and D. Each blend was prepared by simple mixing of the concentrate with the base oil. An additional blend, called the reference blend, was made using the unmodified copolymer of vinyl acetate, maleic anhydride, and fumarate ester described in Example 1. Each of the blends consisted of 7.2 wt. percent of the particular additive concentrate and 92.8 wt. percent of the base oil. Thus, each blend contained approximately 2.9 wt. percent of actual polymeric additive.

Each of the blends was tested for sludge dispersing ability in a Cyclic Temperature Sludge Test which, from prior experience, has been shown to give sludge deposits similar to those obtained in stop-and-go driving such as would be experienced in taxicab operation. Briefly described, in this test a Ford 6-cylinder engine is run on a dynamometer stand through alternate cycles, the first cycle lasting 5 hours, at 1500 r.p.m., and the second cycle lasting 2 hours, at the same operating speed, with the oil pump and water jacket temperatures being slightly higher in the second cycle than in the first. The two cycles are alternated in sequence until the desired total test time has elapsed. Make-up oil is added as required so as to maintain the oil level in the crankcase at all times between about 3½ and 4 quarts. At the end of selected periods of test time, the engine is inspected by disassembling it sufficiently to permit visual examination of several of the parts, including the rocker arm assembly, the rocker arm cover, the cylinder head, the push rod chamber and its cover, the crankshaft and the oil pan. These parts are visually and quantitatively rated for sludge deposits, using a CRC Sludge Merit rating system in which a numerical rating of 10 represents a perfectly clean part, and the numerical scale decreases to a minimum value representing a part covered with the maximum amount of sludge possible. The several merit ratings are averaged to give an overall engine merit rating.

The composition of each of the blends and the results of the cyclic temperature sludge tests are summarized in the following Table II. Since the engine used in some of the tests was more severe in its sludging tendencies than was the engine used in the other tests, the reference blend was run in each of the engines, and the results obtained are judged separately within the group of data obtained with each engine. In judging whether a particular blend is better than the reference oil, ability to run for at least one additional 21-hour period before a merit rating is obtained that is no better than that of the reference oil for the preceding 21-hour rating is considered to be an improvement.

It will be seen from the test results of Table II that modification of polymeric additives in accordance with the present invention as exemplified by Examples 1 and 2, results in a decided improvement in the sludge dispersant properties of the polymers, without adversely affecting the viscosity index improving potency of the polymers, as shown by the data of Table I. Modification of the polymers with closely related amino compounds that are not pseudoaromatic, such as the N-(3-aminopropyl) morpholine of Preparation C or the tetrahydrofurfurylamine of Preparation D, or that do not have the amino group separated from the ring by at least one carbon atom, e.g. the 2-aminopyridine of preparation B, does not result in the desired improvement in sludge dispersancy.

TABLE II.—SLUDGE MERIT RATINGS

| Test, hours | First engine | | | | | Second engine | | |
|---|---|---|---|---|---|---|---|---|
| | Reference | Example 1 additive | Preparation A additive | Preparation C additive | Preparation D additive | Reference | Example 2 additive | Preparation B additive |
| 63 | 9.84 | 9.96 | 9.76 | 9.81 | 9.81 | 9.70 | 9.96 | 9.86 |
| 84 | 9.73 | 9.90 | 9.75 | 9.65 | 8.0 | 9.30 | 9.94 | 9.46 |
| 105 | 9.49 | 9.85 | 9.42 | 9.48 | 6.5 | 7.65 | 9.37 | 7.90 |
| 126 | 9.12 | 9.76 | 9.08 | 7.80 | | 6.00 | 7.90 | 5.20 |
| 147 | 7.85 | 9.38 | 6.90 | 5.70 | | | 4.80 | |
| 168 | | 8.40 | | | | | | |

It will be understood in the foregoing disclosure that what is meant by pseudoaromatic heterocyclic compounds is those heterocyclic compounds that have double bonds in the ring and that have an aromatic sextet of electrons fitting Hückel's $4n+2$ Rule. Attention is directed, for example, to Streitweiser's "Molecular Orbital Theory for Organic Chemists," chapter 10 (John Wiley and Sons, 1961).

It is to be recognized that the acidic function (carboxylic acid or carboxylic acid anhydride groups) in the additives of this invention can be distributed along the polymer backbone either randomly or in ordered fashion, as found in either random copolymers or block copolymers.

What is claimed is:

1. An oil-soluble polymeric additive having multifunctional properties, including viscosity index improving and sludge dispersing properties, which comprises a derivative, selected from the group consisting of amides and imides, of a polymeric material of from about 5000 to 2,000,000 average molecular weight, having a plurality of acid groups, selected from the class consisting of carboxylic acid and carboxylic anhydride groups, distributed along the polymeric chain, and of a pseudoaromatic heterocyclic amino compound having oxygen or nitrogen in the ring, said heterocyclic compound being selected from the group consisting of an aminoalkyl pyridine of the formula:

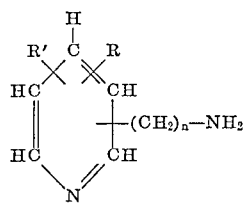

and an aminoalkyl furan of the formula:

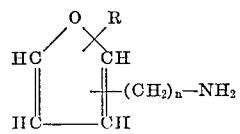

wherein in each formula $n$ is a number from 1 to 5 and each of R and R' is hydrogen or $C_1$ to $C_5$ alkyl.

2. Polymeric additive as defined by claim 1 wherein said acid groups constitute from 1 to 25 mole percent of said polymeric material.

3. Polymeric additive as defined by claim 1 wherein the average molecular weight of said polymeric material is in the range of from about 30,000 to 1,000,000.

4. Polymeric additive as defined by claim 1 wherein said heterocyclic compound is 3-(aminomethyl)-pyridine.

5. Polymeric additive as defined by claim 1 wherein said heterocyclic compound is furfurylamine.

6. Polymeric additive as defined by claim 1 wherein said polymeric material is a copolymer of a $C_2$ to $C_3$ alkylene ester of a $C_2$ to $C_6$ fatty acid, a $C_8$ to $C_{20}$ aliphatic monohydric alcohol ester of a $C_4$ to $C_6$ alpha, beta-unsaturated dicarboxylic acid, and an unsaturated carboxylic acid or anhydride of from 3 to 8 carbon atoms.

7. Polymeric additive as defined by claim 1 wherein said polymeric material is a copolymer of vinyl acetate, maleic anhydride, and mixed $C_8$ to $C_{18}$ aliphatic alcohol esters of fumaric acid.

8. Polymeric additive as defined by claim 1 in which the ratio of amino compound to polymeric material in said derivative is within the range of from 0.1 to 2 moles of amino compound per carboxylic anhydride group in said polymeric material.

9. Polymeric additive as defined by claim 1 in which the ratio of amino compound to polymeric material in said derivative is within the range of from 0.1 to 1 mole of amino compound per carboxylic acid group in said polymeric material.

10. A process for preparing an oil-soluble multifunctional polymeric additive which comprises reacting a polymeric material of from 5000 to 2,000,000 average molecular weight, having from 1 to 25 mole percent of acid groups, selected from the class consisting of carboxylic acid and carboxylic anhydride groups, distributed along the polymeric chain, with a heterocyclic amino compound selected from the group consisting of an aminoalkyl pyridine of the formula:

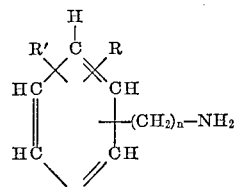

and an aminoalkyl furan of the formula:

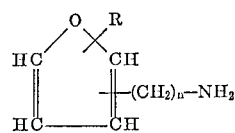

wherein in each formula $n$ is a number from 1 to 5 and each of R and R' is hydrogen or $C_1$ to $C_5$ alkyl, said reaction being conducted at a temperature in the range of from 200 to 450° F. for a period sufficient to cause the splitting out of water of reaction, whereby amide or imide formation between said amino group and an acid group occurs, the amount of heterocyclic amino compound used in said reaction being within the range of about 0.1 to 2 moles of amino compound per acid anhydride group and within the range of about 0.1 to 1 mole of amino compound per carboxylic acid group in said polymeric material.

11. Process as defined by claim 10 wherein said heterocyclic amino compound is an aminoalkyl pyridine derivative.

12. Process as defined by claim 10 wherein said heterocyclic amino compound is an aminoalkyl furan.

13. Process as defined by claim 10 wherein said polymeric material is a copolymer of a $C_2$ to $C_3$ alkylene ester of a $C_2$ to $C_6$ fatty acid, a $C_8$ to $C_{20}$ aliphatic monohydric alcohol ester of a $C_4$ to $C_6$ alpha,beta-unsaturated dicarboxylic acid, and an unsaturated carboxylic acid or anhydride of from 3 to 8 carbon atoms.

References Cited

UNITED STATES PATENTS

| | | | |
|---|---|---|---|
| 2,912,416 | 11/1959 | Newey | 260—80.73 |
| 3,471,460 | 10/1969 | Rees | 260—88.1 |
| 2,892,821 | 6/1959 | Stewart et al. | 260—80.73 |
| 2,957,854 | 10/1960 | Lorensen et al. | 260—80.72 |
| 3,235,503 | 2/1966 | De Vries | 252—51.5 |

JOSEPH L. SCHOFER, Primary Examiner

J. KIGHT, Assistant Examiner

U.S. Cl. X.R.

252—51.5; 260—80.72, 80.73, 895